United States Patent [19]
Medinger

[11] Patent Number: 6,050,743
[45] Date of Patent: Apr. 18, 2000

[54] SPREADER FOR TREATING SOIL

[76] Inventor: Jean Claude Medinger, 21, rue Aguste Demmier, F-92340, Bourg-la-Reine, France

[21] Appl. No.: 09/068,946

[22] PCT Filed: Nov. 28, 1996

[86] PCT No.: PCT/FR96/01890

§ 371 Date: May 21, 1998

§ 102(e) Date: May 21, 1998

[87] PCT Pub. No.: WO97/20109

PCT Pub. Date: Jun. 5, 1997

[30] Foreign Application Priority Data

Nov. 28, 1995 [FR] France ................................. 95 14072

[51] Int. Cl.⁷ ............................. E01C 19/20; A01C 17/00
[52] U.S. Cl. ............................. 404/90; 404/92; 404/108; 111/178
[58] Field of Search ..................... 404/90, 92, 108; 111/177, 925, 63, 73, 77, 170, 178; 222/26, 611.2; 55/356

[56] References Cited

U.S. PATENT DOCUMENTS

| | | |
|---|---|---|
| 2,479,800 | 8/1949 | Williams . |
| 3,375,764 | 4/1968 | Petersen . |
| 3,598,027 | 8/1971 | Swisher . |
| 4,102,590 | 7/1978 | Zanzie ...................................... 404/110 |
| 4,990,025 | 2/1991 | Young et al. .............................. 404/92 |
| 5,190,398 | 3/1993 | Swisher et al. ........................... 404/90 |
| 5,591,244 | 1/1997 | Vross et al. .............................. 55/356 |
| 5,598,794 | 2/1997 | Harms et al. ............................ 111/117 |

FOREIGN PATENT DOCUMENTS

| | | |
|---|---|---|
| 2028777 | 5/1979 | United Kingdom ........... B65G 65/40 |
| 2 028 777 | 3/1980 | United Kingdom . |

*Primary Examiner*—Eileen Dunn Lillis
*Assistant Examiner*—Raymond W. Addie
*Attorney, Agent, or Firm*—Nixon & Vanderhye

[57] ABSTRACT

A spreader for spreading treatment products on soil to improve the quality thereof is disclosed. The spreader consists of a vehicle including a frame (103) slidably housing an assembly (105, 106) of a hopper and a metering device. The frame also supports soil shearing means (114) located ahead of the hopper, and mixing means (112) located behind the hopper for mixing together the spread product and the loosened soil. As a result, soil treatment may be enhanced and the nuisance caused by spreading may be diminished.

18 Claims, 6 Drawing Sheets

SPREADER FOR TREATING SOIL

This invention relates to spreaders which enable soil to be treated, more particularly by spreading onto it products intended to improve its characteristics, notably its mechanical characteristics, in order, in particular, to allow other work to be carried out on top of it.

It is known that in order to construct a road or a car park, for example, it is very uncommon to be able to lay down the necessary materials directly onto the rough ground. Apart from the laying out and grading operations, it is often necessary to treat the soil by spreading onto it a product such as lime or cement and then mixing these materials with the original material of the soil. These soil treatment techniques have largely been developed in recent years. They have brought an important development to prominence, in particular in temperate, humid areas, because they enable the moisture content of soils to be corrected, for example by supplying quicklime. Furthermore, and possibly in addition to this additive, in areas where aggregates are rare it is more economical to add cement, which allows a foundation layer to be produced straight away.

Currently known materials for carrying out this type of treatment are described in particular in European patent application No. 0462899, as well as in French standard NFP98-712. By way of example, a known spreader comprises a tank which acts as a silo, extraction means enabling a hopper situated at the end of this tank to be supplied, and a metering device receiving the product from the hopper and spreading it on the soil. This assembly is integral with a supporting chassis which can be either towed or self-propelled. Rubber skirts placed around the material outlet opening allow wind effects to be limited to a greater or lesser extent.

Despite numerous attempts to improve these devices, of which the afore-mentioned French standard gives a fair summary, these machines have undergone limited development. Consequently, and in spite of these improvements, the spreading technique has a long way to go before achieving a satisfactory level of development, and the defects concerning in particular the non-uniformity of longitudinal and transverse dispersion are always present at a level which is frequently dissuasive.

Because of the change in attitudes, one drawback which is becoming increasingly important concerns the dispersal of dusts, which adversely affect the protection of the environment and the well-being of persons working on the site or living in the vicinity. This drawback is now considered so important that it frequently causes site work to stop, for example in the presence of wind, which carries the dust over fairly large distances. This dust dispersal occurs when the spreader is filled by pulsed air transfer. Moreover, during spreading, in spite of the basic protection afforded by the above-mentioned skirts, the powdery spread product often drops from an appreciable height—necessitated by the need for an adequate clearance between the outlet of this product and the ground due to irregularities in this ground. The kinetic energy accumulated during this fall by the particles is dissipated by rebounding on contact with the ground, causing a cloud of dust.

Furthermore, the mass of the product contained in the spreader has irregularities in the density, which can be large, in particular when the spreader is loaded by pulsed air transfer. The product thus contains irregularly occluded air and its grains are furthermore charged with static electricity, which increases the irregularities in the density. This effect is even more marked when the product is delivered warm, which is also frequently the case.

Moreover, the product is extracted from the silo where it is contained by mechanical processes, such as a screw or a conveyor belt, to be transported to the metering device and distributor which in the majority of cases are situated at the rear of the spreader. This causes an additional change in the density of the product by compression and/or bulking. In certain cases extraction is effected by pulsed air and the differences in pressure which are produced inevitably have the same results on the density of the product. Furthermore, the product transported in this way to the rear of the spreader is then generally distributed transversely by means of divergent pitch screws, then metered for example with the aid of an alveolar drum, a helmet or a conveyor belt. This last operation further increases the risks of irregularities in the distribution of the product on the surface of the soil.

To overcome these drawbacks the invention proposes a spreader for treating soil, of the type containing a silo and metering means placed at the lower part of the silo to be directly gravity fed from this silo, principally characterised in that the lower part of the silo forms a hopper having the form of a truncated prism whose base is upwards and whose truncated lower part is directly attached to the metering device and extends, along with the metering device, over more or less the entire width of the spreader to treat the soil over more or less this entire width without pulverizing the product to be spread.

According to another feature, the spreader contains supporting means to vertically raise and lower the silo/metering device assembly in order to adjust the distance between the soil to be treated and the metering device.

According to another feature, these supporting means of the silo/metering device assembly also enable said silo/metering device assembly to be tilted forwards and backwards.

According to another feature, these supporting means are formed from 3 or 4 jacks situated at the periphery of the silo and articulated by means of trunnions or universal joints.

According to another feature, the metering device is a large diameter rotor type fitted with small cells.

According to another feature, the spreader contains means for attaching the metering device to the hopper, enabling the type of metering device to be changed.

According to another feature, the spreader contains a frame which is open over the entire width of the spreader to receive the silo, whose transverse cross-section is constant with respect to the axis of the spreader and maximum with respect to the opening of the frame.

According to another feature, the spreader contains four wheels able to pivot through 180 degrees, situated at the four corners of the frame, to widen the track, to increase the stability of the spreader, and to avoid crushing the edges of the strip of material discharged onto the soil.

According to another feature, the spreader furthermore contains a vertical transverse and central partition dividing the silo into two parts, and means for controlled closing of the junction between the hopper and the metering device so as to feed the metering device via one and/or the other of the two parts of the silo.

According to another feature, the spreader contains two rotating metering devices of different diameters intended to be fed by each of the two parts of the silo, respectively, and the vertical central partition is movable in order to delimit two unequal parts whose volumes correspond to the flow rates of the metering devices.

According to another feature, the silo contains an opening able to be connected to a filter enabling the air carried into the silo by the means for filling this silo with the treatment product to be evacuated, before the start of work; this filter being supported by a trailer able to be coupled to the spreader in a towing position or in a transportation position.

According to another feature, the spreader furthermore contains mixing means situated behind the metering device to provide mixing of the soil and the product spread on the soil at the front of the mixing means; these mixing means being attached to the frame by means for adjusting their height with respect to the soil.

According to another feature, the spreader furthermore contains two casings enclosing the mixing means and the metering device, respectively, and containing openings fitting together one within the other in the operating position to provide sealing of the assembly.

According to another feature, the mixing means are divided into two separate parts with respect to the longitudinal plane of symmetry, separated and situated in front of each of the rear wheels, respectively, making a non-mixed space between them, to mix two strips of soil intended then to be crushed by these wheels.

According to another feature, the spreader furthermore contains soil shearing means situated in front of the metering device to loosen the soil prior to the spreading of the product; these shearing means being attached to the frame by means for adjusting their height with respect to the soil, being able to operate independently of the other means for adjusting the heights of the silo and of the mixing means.

According to another feature, these shearing means are fitted with a motor enabling the tensile stress of the spreader on the shearing means to be minimized.

According to another feature, the spreader furthermore contains means for measuring the weight of the silo/metering device assembly and means for processing the signals obtained by these measuring means, in order to determine from the variation in this weight the flow of the product spread on the soil and to control the flow rate of the metering device in order to obtain a uniform distribution of the product on the soil.

According to another feature, these measuring means operate on the oil pressure in the jacks, enabling the position of the silo to be adjusted.

According to another feature, the spreader furthermore contains means enabling the position of the strip of product spread on the soil to be detected and the direction of advance of the spreader to be controlled to maintain the successive strips of spread product contiguous with each other.

Other distinctive features and advantages of the invention will be clearly revealed in the following description, given by way of a non-limiting example with reference to the accompanying figures, in which.

Figure 1:
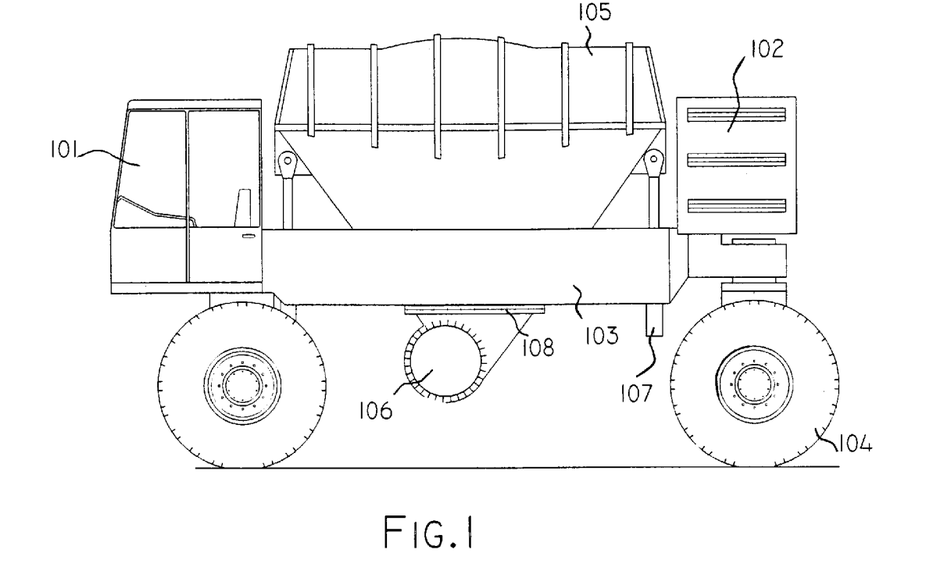
FIGS. 1 and 2 show side views of a spreader according to the invention, in the transportation position and in the operating position.
Figure 2:
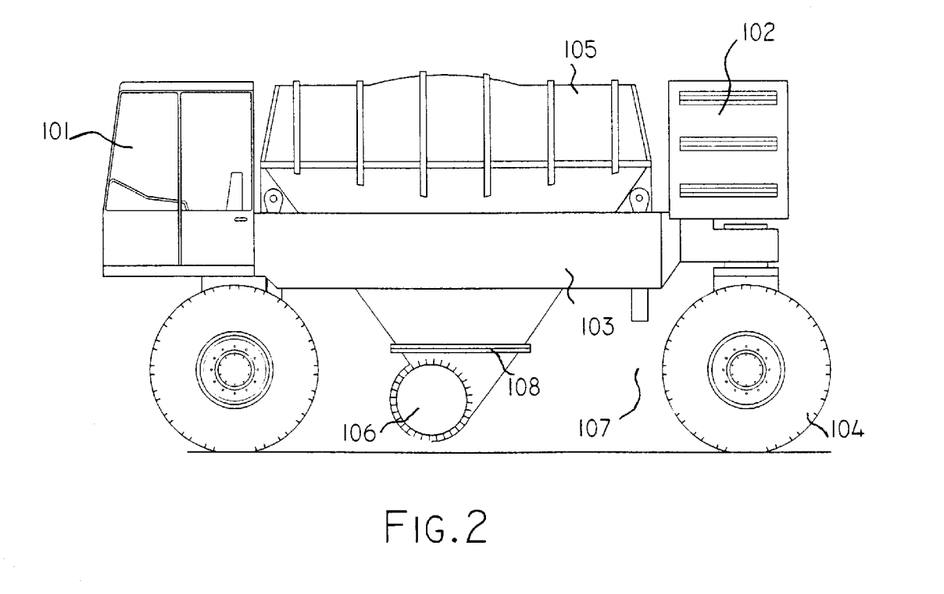

The spreader according to the invention and shown in FIGS. 1 and 2 has the form of a self-propelled motor vehicle containing a chassis 103 forming a completely open frame on which are mounted treatment devices which will be described later. This chassis 103 rests upon at least four single or twin wheels 104 attached to the four corners of the chassis, respectively, by means of a support able to pivot about a vertical axis, which enables the stability of the spreader to be increased. By using the same steering radius for the front and rear wheels, the spacing of these wheels and the position of their vertical pivot enables the imprint of the wheels, as well as the throw of the product onto the soil, to be arcs of circles admitting the same centre, and each wheel is at a tangent to the treatment section or crushes it at a distance such that its passing does not produce a widening of this section by collapsing or crushing it. The quality of the work is thus improved. Furthermore, to limit the overall width of the assembly, the lateral struts of the frame 103 are manufactured with a beam of small width, but sufficiently high to have the necessary strength.

At the front the chassis supports a cab 101 for the driver, and at the rear the driving gear 102 enabling the necessary power for moving the machinery and for the operation of the spreading and soil treatment devices to be supplied, for example by hydraulic means.

The assembly designed to contain the treatment product and to spread it on the soil is formed by a silo 105, having the form of a more or less parallelepiped tank surmounting a hopper in the form of a truncated prism, terminated by a rotary metering device 106. The wide base of the prism faces upwards and its apex faces downwards. This apex is truncated horizontally at the bottom of the hopper to form a mounting joint 108 between this hopper and the metering device 106, which is detachable. Under these conditions, the lateral parts of the silo are vertical with respect to the axis of the vehicle, and the transverse parts are slightly inclined inwards in the high part, then inclined towards the metering device to form the hopper so as to directly feed this metering device by simple gravity.

The walls of the silo are thus inclined so that the flow is smooth. Furthermore, the flow being gravitational, it is not necessary to fluidize the product, which eliminates all the problems caused by fluidization, as is necessary in known devices.

The metering device 106 extends the entire width of the silo and of the vehicle, the work is carried out at the full width and the spreading width corresponds to more than the storage width, which means that there is no additional handling of the product in order to adapt the extraction width in the silo to the spreading width, which eliminates the drawbacks resulting from this handling.

Moreover, such an arrangement allows large-scale systems to be used for the metering device 106, such as for example the large diameter alveolar drum shown in the figure, or in variants a conveyor belt metering device. The bolted attachment of this metering device to the joint at the base of the hopper allows the metering device to be changed for best adaptation to the work in hand. The use of metering devices of large dimensions also allows limited pulverization of the material to be spread, which reduces the movements inside the spreader and allows trajectories of the product grains to be obtained which are coplanar with a longitudinal plane. Since the trajectories are short, the speeds are reduced.

The result of all these arrangements is that the product is deaerated during its movement and its density is stabilized, which enables the consistency of the spreading operation to be much improved.

Furthermore, for a given flow rate, the use of a large diameter drum allows the dimensions of the cells to be reduced, which allows better distribution of the product on the soil. It also enables a larger daily linear flow rate to be obtained, which allows the efficiency of the spreader to be increased.

According to the invention, in order to attach the silo 105 to the frame 103, adjustable means permitting the height of the assembly 105/106 to be varied with respect to the ground will be used. For example, these means will take the form of 4 jacks 107 placed at the four corners of the silo, as shown in the figure, or possibly three jacks with one of them mounted centrally to facilitate control and avoid a hyperstatic arrangement. These jacks are fitted with attachment means permitting a semi-pendular suspension of the silo/metering device assembly, in order to reduce stresses associated with the movements and to avoid the effects of possible deformations of the chassis. These means will be formed, for example, by a strap attachment between the axis of the jack and the silo, and attachment by trunnions between the body of the jack and the chassis. If necessary, these trunnions will be equipped to form a universal joint.

The silo 105 is attached to the frame 103 in this way in a sturdy and flexible manner, always being able to carry out vertical translation movements on command, with respect to said frame, which allows the height of the spreading of the product with respect to the ground to be adjusted, to influence in particular the level of dust emission.

Furthermore, by actuating the jacks in a differential manner the silo will be able to be tilted to the front or to the rear, which allows the inclination of the hopper, and thus the feed conditions of the metering device, to be varied, to change the flow conditions of the product to be spread. As described later, this variation in inclination also allows the silo to be divided into two parts to increase the feed gradients by about 15°, from approximately 55° to approximately 77°, for example, in order to improve the feed for the metering device by gravity, with minimum pulverization of the material to be spread.

In the lowest position, the silo will rest on the frame 103, which will provide a rest position, useful for example for transporting the machine on a trailer. By way of a variant, measuring means, for example strain gauges, can be placed at the supports at the end of the travel of the silo on the frame, which allow the weight of the silo and its contents to be determined, for example in order to limit filling of the silo where particularly heavy material is used, and to know the mass spread between two weighing operations.

Figure 3:
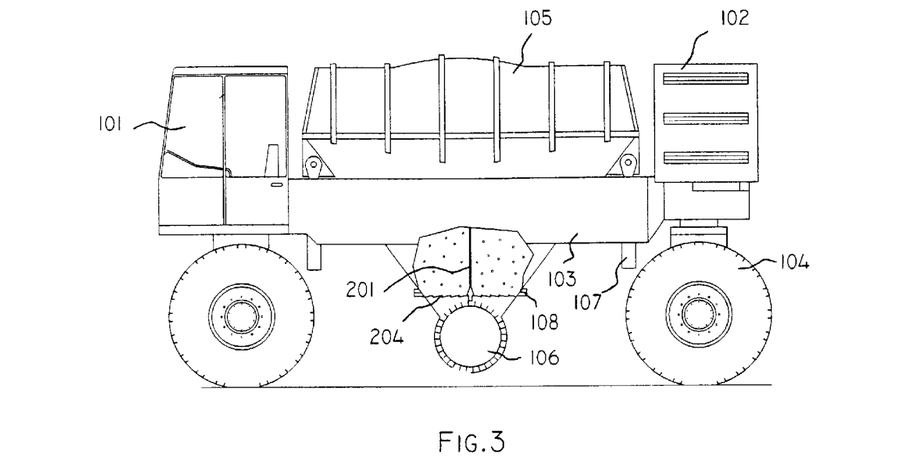
FIGS. 3 to 5 show side views of a variant of this spreader in one rest position and two operating positions.
Figure 4:
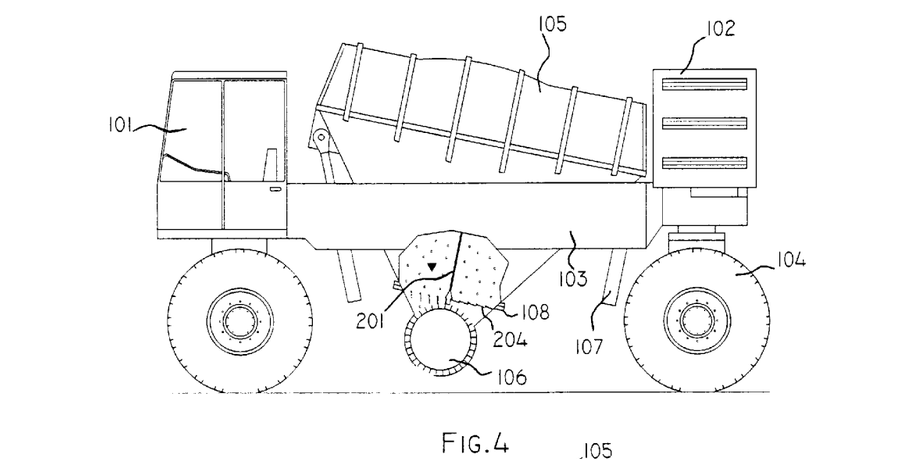
Figure 5:
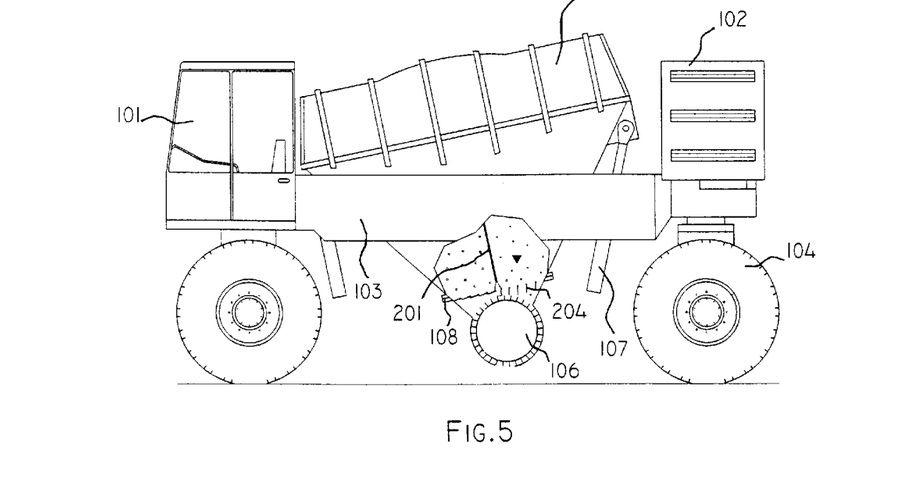

The inclination of the silo to the front and to the rear, obtained by differential action on the jacks, is shown in FIGS. 3 to 5, which also show a variant of the invention where the silo is divided into two parts by a fixed, central, transverse internal partition 201. It can be seen that the slight inclination of the walls of the high part of the silo, referred to above, allows said silo to be tilted to a maximum extent forwards or backwards without theses walls interfering with the cab 101 or the engine 102.

Closing means 204, formed for example by movable flaps, prevent, at will, the product to be spread from falling into the metering device 106. This closure can be made independently for the front part of the silo and for the rear part. The silo can be completely closed in this way when it is horizontal, as shown in FIG. 3.

In order to spread the product contained in the front part of the silo, the silo is inclined to the rear, as shown in FIG. 4. The flaps which seal off this front part are then opened, while keeping closed those which seal off the rear part, and the drum of the metering device is rotated. The product thus falls onto the metering device in the most vertical manner, since the front partition of the hopper is clearly more vertical than in the position shown in FIG. 3, and the central partition 201 has more or less the same inclination.

In this way, under the effect of gravity, a movement towards the metering device of all the mass of the product contained in the front part is obtained, and any vaulting or chimney effect which would cause pulverization of the product and lead to local variations in the density, adversely affecting the uniformity of the spreading operation, is avoided.

When the front part of the silo is empty, the front flaps are closed, the silo is tilted forward and the rear flaps are opened, as shown in FIG. 5, This allows the rear part of the silo to be emptied under the same conditions as the front part.

More complete use of the volume of the product contained in the silo can also be obtained in this manner.

When the spreading operation is carried out on a surface by means of successive strips corresponding to to-and-fro movements of the spreader, one of the parts of the silo can also be used for one strip and the other part for the other strip. In this way, the volume of the product can be left to stand in each part during half the operating time, which contributes to the stabilization of the product.

It is also possible to fill the two parts of the silo with different treatment products and to use one or the other as required.

Figure 6:
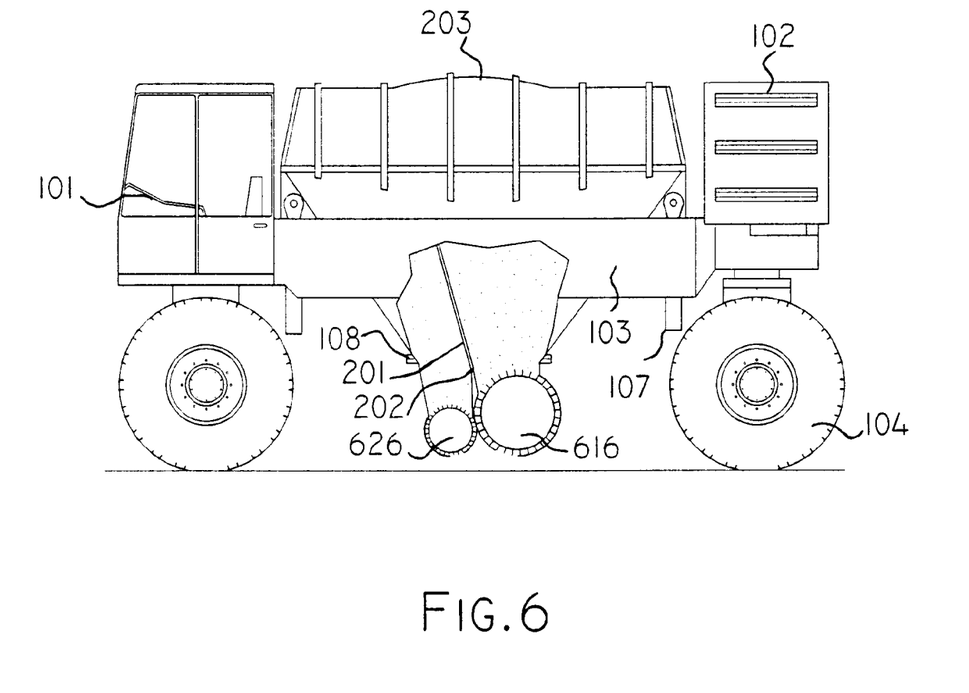
FIG. 6 shows a side view of a variant of this spreader, containing a dual metering device.

In order to be able to mix products in different and specified proportions, possibly variable, for example one part lime to six parts cement, where the soil is slightly clayey and not very moist, the invention proposes to use two separate metering devices of different sizes, each fed by one part of the silo which is a different size from the other part, as shown in FIG. 6. For this, the central partition 201 will preferably be moveable so as to tilt about a transverse clevis pin 202 situated at the joint 108. The roof of the silo will be arranged to form a hump 203 which, among other things, enables the forward and backward movement of the partition to modify the volume of these two parts.

As shown in the figure, the single metering device 106 has been replaced by two rotary metering devices 616 and 626 in parallel and of the same width. This replacement is facilitated by the bolt fixing at the joint 108. On the other hand, these metering devices have different diameters in relation to the proportions of the products to be spread. This relationship is not necessarily a direct proportion which could lead to very large differences in diameter, one of the metering devices being much too large and the other much too small. To rectify this drawback, metering devices of reasonably different diameters will then be used and the desired dosing obtained by rotating them at different speeds of rotation, the largest rotating faster than the smallest. Conversely, the smallest will be rotated faster than the largest to reduce the dosing difference and to be able to use the same set of different metering devices without multiplying the number in relation to the desired variations in dosing.

When the spreader is to be equipped with such an arrangement, the two parts of the silo will be filled with quantities of products to be spread which directly correspond to the proportion of the mixture to be obtained, to avoid interruption to the work by reloading one part of the silo while the other is still not empty. Thus, to be able to completely refill the silo, the central partition 201 will be inclined to obtain volumes from the two parts corresponding to the quantities required. In practice, the displacement of this partition will be blocked at the value required by a cable of a length determined for this purpose. Thus by filling the part at the side where the cable is situated, the partition will tilt under the effect of the thrust of the product, until the cable is tightened. After this part is filled, the other will then be filled, and the spreader will therefore contain the desired quantities of product.

This arrangement thus allows the formulas of the spread products to be optimized, for example, in addition to the case already mentioned, by combining a road binder with cement, or by mixing a pozzolanic flue dust with a dope.

It is known, furthermore, that the inventor has proposed in French patent number 2359452 filed on Jul. 21, 1976 under number 7622201 and granted on Oct. 3, 1980, a spreader with dosing by weight equipped with recording and monitoring means which enable the quantity of product spread on the soil to be known.

In order to better assess the effectiveness of the soil treatment means, the French Government has developed a measurement method which enables, with a certain degree of approximation, the mean value and the standard deviation of the distribution of the spreading operation to be known.

This measurement method uses, among other things, canvas to determine the transverse and longitudinal dispersions, and a measurement of the axle loads before and after spreading, with the aid of moveable balances to determine the mean value of this spreading operation.

In order to convert the known result into a direct improvement in the characteristics of the spreading operation the invention proposes to correct in real time the flow of the product to be spread by influencing the flow rate of the metering device 106 in relation to this flow rate measurement, obtained indirectly by measuring variations in the weight of the silo/silo/metering device assembly 105–106, which gives the weight of spread product.

The weight of this assembly can be measured in different ways. One of these consists in placing strain gauges at suitable locations on the attachment points of the silo 105 on the frame 103. The other way consists in measuring the oil pressure in the hydraulic system for adjusting the height of the silo. This second way is simpler, but it requires this height to be effectively adjusted by a hydraulic system.

A measurement of the variation of this weight is obtained from the instantaneous weight measurement by controlled electronic means, and thus the dose spread per unit of area is directly determined by measuring the speed of advance of the spreader. The speed of rotation of the drum of the metering device 106 can then be adjusted to continuously maintain this value at the chosen desired value by means of a system of automatic regulation. The performance of electronic systems currently available enable this regulation to be obtained with a margin of error which is completely satisfactory for the known requirements.

Furthermore, by known methods of fine analysis of the variations of the signals thus obtained, the variations in the slip of the product in the silo leading to overloading or discharging of the metering device, for example, can be accurately determined. Knowledge of these movements will then enable corrective action to be implemented, for example by displacing the silo forwards or backwards to regularize the distribution of the material in the silo. If required, recording these signals over a sufficiently long period will allow corrective action to be taken on the structure of the silo, for example by modifying the shape and inclination of the partitions, or inserting moveable internal partitions at locations which depend on the materials employed.

The simple solution for managing this system consists in using a suitably programmed PC-type microcomputer. The functions to be controlled being relatively simple, a considerable treatment capacity will thus be available, which can be used for functions which are supplementary to the invention.

The invention therefore further proposes to use sensors connected to this electronic device to identify the line of demarcation between the section of soil which has received the treatment product and the section of this soil which has not received it. These sensors can operate in different ways, by detecting contrast, temperature or height difference, etc. Having obtained this information in this manner, it is easy to process it to determine corrective action enabling the trajectory of the spreader to be corrected in order to adjust the connection between the strips of treated soil. This can be done either by signals to the driver or even by automatic action on the steering of the towing vehicle.

The invention also proposes to place safety sensors which allow the operation of the spreader to be interrupted at any time when specific parameters linked to the discharge cycle or to safety, such as the presence of obstacles, or excessive tensile stress on the shearing devices or mixing of the soil, are exceeded.

As was seen above, an important dust source is that due to the filling of the hopper, especially when this filling is carried out with pulsed air.

Figure 7:
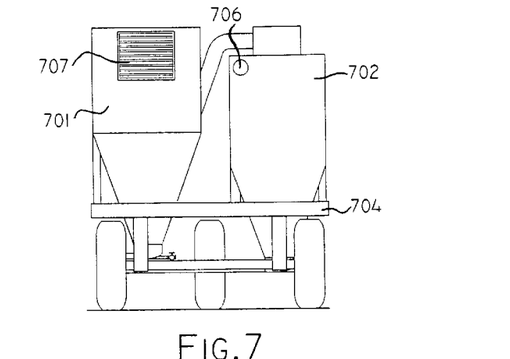
FIG. 7 shows a rear view of a filter adaptable to the spreaders of the preceding figures.
Figure 8:
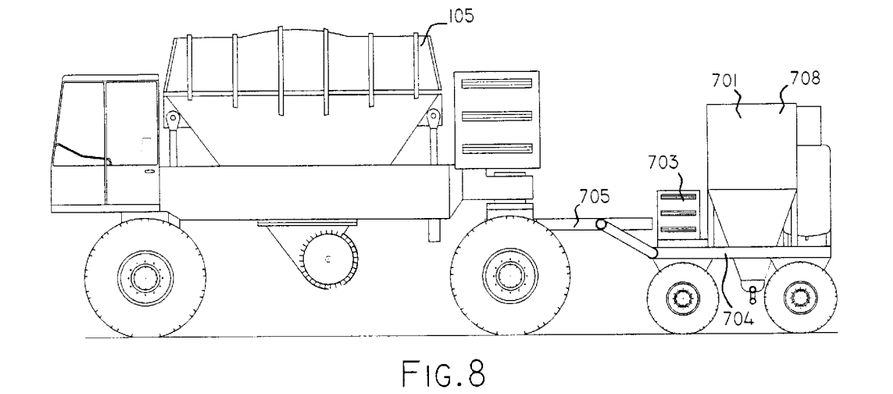
FIGS. 8 and 9 show side views of this filter coupled to one of these spreaders.
Figure 9:
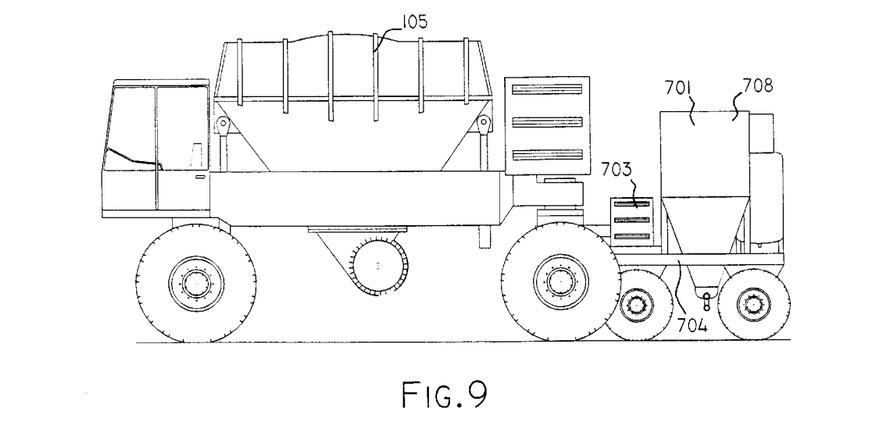

In order to eliminate these drawbacks, the invention therefore proposes to use an industrial filter of a known type, shown only in a rear view in FIG. 7, and in a side view and coupled to the spreader according to the invention, in FIGS. 8 and 9.

This filter 701, of the diaphragm type for example, is connected to a filter cyclone 702 and is driven by a compressor unit 703. The assembly is placed on a trailer 704.

Advantage is taken of the small space taken by the length of the spreader while transporting the assembly between two sites by coupling the trailer onto the spreader, as closely as possible to said spreader, as shown in FIG. 9. This enables this assembly to be transported on a single vehicle, of the cart type for example, and to thus economize on transportation means.

Similarly, for movements within the site, this small space requirement enables the filter to be towed by connecting the trailer to the spreader by a drawbar 705, as shown in FIG. 8; the spreader acting as the towing vehicle. There is therefore no need to make the filter self-propelled or to provide a separate towing vehicle.

On the site, the trailer is unhitched to park it at the area where the products to be spread are dumped. During the spreader loading operations the silo 105 of the spreader is connected to the filter cyclone 702 by a flexible hose, not shown, which is connected to an opening 706. The pulsed air having been used for the transfer of the product into the silo is then filtered in this assembly and escapes cleanly into the atmosphere by the opening 707. Compressed air contained in a reservoir 708, for example, can be used to blow out and purge the assembly of the dust thus accumulated, and to return it to the storage silo.

It is known in the prior art that, having spread the product on the soil, it is then mixed with the earth by mixing the soil and the product with the aid of a device such as, for example, a cutter carried on a vehicle operating independently. Besides the additional dust source resulting from this mixing operation, the presence of the loose product on the soil during an unspecified time between two operations, still causes an additional risk of direct action of wind on this product layer, which is extremely sensitive to the action of the wind when it is in a relatively thin layer on the soil. Apart from this nuisance caused by the wind, quality problems of a meteorological origin due to the action of rain, which can wash off the product layer prior to mixing, can also arise.

Now the thermal output of the engine 102 is specified to allow the movement of the spreader in difficult conditions, notably at full load, at high speed, on difficult ground having poor lift, on ramps with steep gradients, etc.

During the spreading operations, which generally take place on well-prepared and flat ground and at a moderate speed, a considerable speed reserve is therefore available, all the more so since the means of the invention demand only a small amount of power for the actual spreading itself, because of the extraction of the product by gravity and the use of a rotary metering device.

Figure 10:
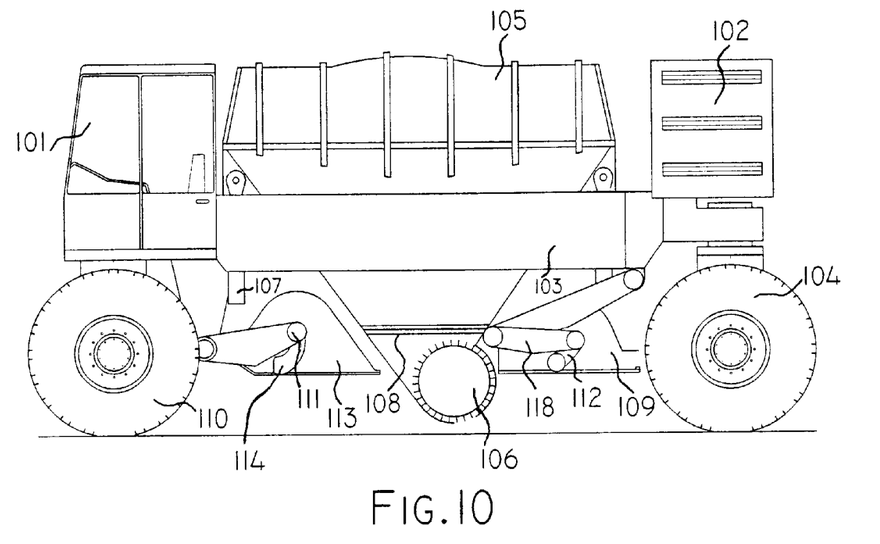
FIGS. 10 and 11 show side views of a spreader represented in FIGS. 1 and 2, containing addition soil mixing means.
Figure 11:
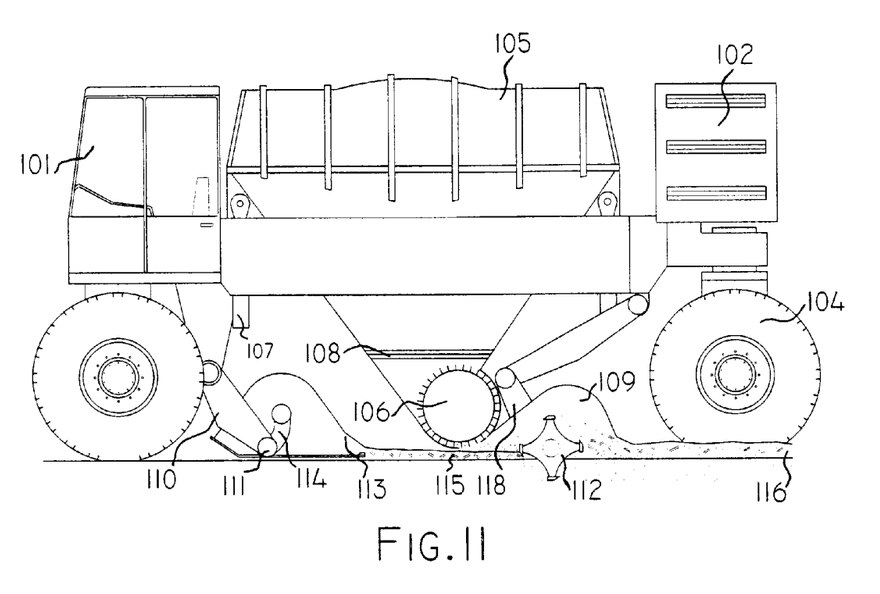

It should furthermore be noted that the prismatic shape of the lower part of the silo of the spreader makes available, according to the invention, at the front and at the rear of the spreader, a large free space which enables various supplementary means to be housed, which are shown in FIGS. 10 and 11, respectively, in two end positions, one an operating position and the other a completely raised position for transfer of the spreader outside the spreading operations.

The invention therefore proposes to combine at least the two spreading and mixing operations, or at the very least premixing operations, in a single operation by placing mixing means on the spreader, such as at least one cutter 112 situated just to the rear of the metering device 106. This cutter is connected to the rest of the machine by adjustable attachment means such as the arms 118, which are advantageously articulated onto the chassis to be supported by this chassis, which will bear the reaction forces.

This cutter is indirectly driven by the engine 102 via a hydraulic transmission system. It is driven by a relatively slow movement and it provides mixing of the soil with the material to be spread with maximum prevention of the formation of dust. Furthermore, a casing (or bell) 109 to cover the cutter can be advantageously used, which will be capable of partially covering the casing of the metering device without touching it, to prevent mutual interference between these casings.

The slow premixing movement obtained in this way enables the powdery product to be introduced into the soil and to be covered with earth. When the mixing subsequently takes place after the passing of the spreader at the time of the action of the powerful cutter of a mixer which is intended to energetically mix the soil and the product, the teeth of the rotor no longer directly act on the product deposited on the surface of the soil. The level of dust emission is therefore considerably reduced.

The fact of proceeding with premixing of the binding agent with the soil after spreading means that the rear wheels of the spreader no longer crush the section of binding agent as described above, but the soil/binding agent mixture.

Since the mixing width is greater than the external width between wheels, the passing of the wheels causes a vertical deformation by compaction in the uncompacted soil due to the imprint of the wheel, without causing lateral movements.

It follows that the spacing between the rear wheels no longer represents a design constraint for the spreader. In particular, the wheels can be as far apart as possible so as to increase the stability of the machine.

The width of the spreading operation is therefore freely determined, the only requirement being to proceed with mixing which is wider than the width of the spreading operation and to include the width of the wheels to some extent so as to obtain a lateral stop and to avoid collapse of the soil/binding agent wall with displacement as the wheel passes by.

This solution is of interest in producing low capacity spreaders, capable of being adapted to use on small sites. It also enables fixed axles whose wheels are possibly guiding wheels, to be used instead of wheels pivoting through 180°.

Thus to prevent mixing between the part having received binding agent and that which has not received it, the mixing chamber will be partitioned by a disc similar to that of a plough inserted in the cutter at the limit of the spreading area. Moreover, any interference between the strips is avoided in this way and the part which has received the binding agent is perfectly delimited.

The repeat operation will then be carried out by juxtaposition of contiguous strips.

When sites are being developed which do not require premixing, but mixing over the entire width, two small mixers placed in front of each wheel, respectively, will be advantageously used.

An operating economy will be obtained since the width of the mixing is reduced.

The width of each cutter will be determined with respect to the soil—soil/binding agent demarcation line, with a border related to the inner mould of the tyre of the wheel, to avoid collapse, and, for the same reason, a border related to the external demarcation line, without the border corresponding exactly to the width of the tyre.

The installation and the mechanical drive of these two cutters can be realized with the aid of devices and an axle which are common to both.

Taking into account the available space at the front of the spreader, and the desirable limits of the mixing forces at the cutter situated at the rear of the spreader, the invention also proposes to prepare the soil in advance of the spreading of the product, so that the mixing means 112 can act on the soil which has already been prepared, that is loosen, so as to facilitate the mixing operation while reducing the forces at this level and thus minimizing to a maximum extent the creation of dust.

For this, soil shearing means are used, such as a rotor 111 fitted with picks and placed under a casing 113 which hides it in the figure where the rotor is denoted by its spindle. This casing (or bell) 113 will enable any production of dust to be limited, which can be produced, for example, in the case of very dry soil. The rotor is attached to the frame 103 by arms 110 which allow it to be raised when not in use, and to lower it to sink it more or less into the soil, depending on the requirements. Openings 114 made in the lateral walls of the casing 113 allow it to rest on the soil at all times, whatever the depth of the rotor.

By lowering the rotor fitted with picks into the soil by ten or so centimeters, for example, these picks then shear the soil and aerate it so that it emerges in the form of a loose layer 115 behind said picks, to receive the product delivered by the metering device 106. It is then mixed by the cutter 112 and forms a treated layer 116.

The use of such a device driven by a movement obtained by means of a motor, hydraulic for example, allows the tensile stress exerted on the rotor by the frame to be minimized. The power required for the shearing of the soil will therefore be basically transmitted from the main motor by hydraulic transmission. The total power will certainly be supplied by this motor, which also drives the tractor part, but the force at the wheels will be minimized, which can be large depending on the state of the soil and the dimensions of the driving wheels.

The heights in relation to the soil of each of these pieces of equipment, whether they be the metering device 106, the cutter 112 or the ripper rotor 111, can be adjusted separately so as to optimize the operating conditions of the assembly, perhaps even in such a way that only one of them is used in particular cases.

Figure 12:
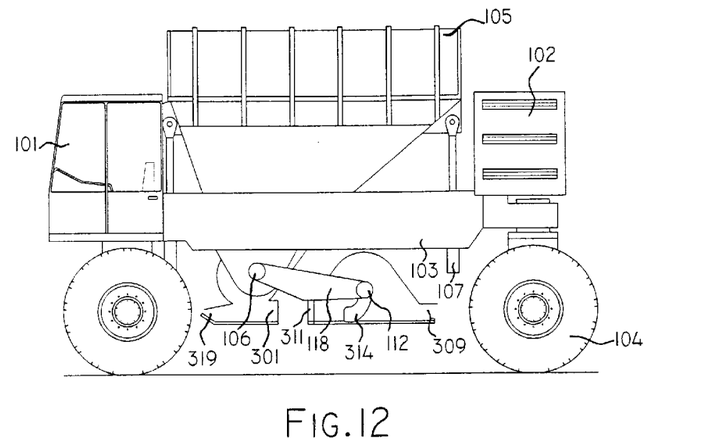
FIGS. 12 to 14 show side views of a variant of a spreader represented in FIGS. 10 and 11.
Figure 13:
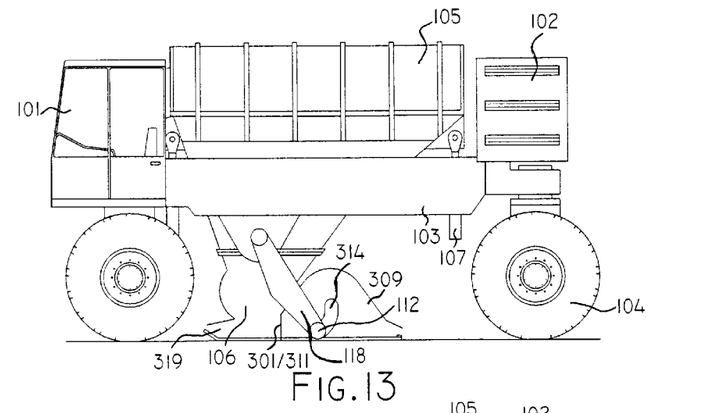

FIGS. 12 and 13 show a variant of the spreader shown in FIGS. 10 and 11, in which none of the ripping means described above are used.

The cutter is contained in a casing 309 which always rests on the soil in operation, thanks to an opening 314 which allows vertical displacement of the cutter spindle. The metering device 106 itself is enclosed in a casing 319 which in operation also rests on the soil at all times. The casing 319 contains a longitudinal rear opening 301, and the casing 309 has a longitudinal front opening 311 to allow the layer of spread product to pass without hindrance. These openings are provided to allow the two casings to fit one within the other when they are lowered into the operating position, thus ensuring very good sealing around the metering device and the cutter.

In this version, the lower opening of the hopper can be moved forward while increasing the available space at the rear of the spreader. This allows the dimensions, and thus the power and the size, of the cutter to be increased and to obtain a machine in which the two functions of spreading and complete mixing to a great depth are combined. Besides the solution of the dust problems, the use of two separate machines which operate in two successive passes is thus avoided. The economy produced by this means is obvious and is especially useful in short-term operations. Furthermore, on a large-scale site where conventional type spreaders are already present, if need be, the spreader according to the invention can be used exclusively for mixing by not lowering the cutter and keeping the other devices raised.

Figure 14:
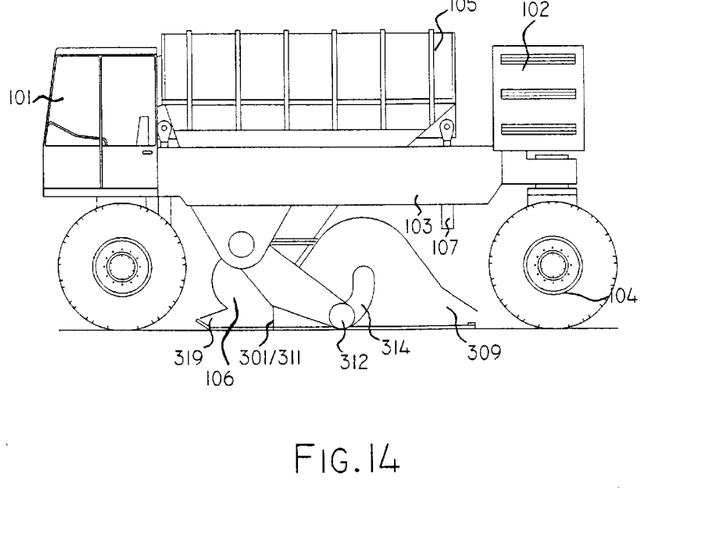

In this spreader, shown in FIG. 14, a large, high-powered cutter 312 is used, which enables direct, complete and definitive mixing to be carried out without running an additional machine.

Mixing at high speed can thus be obtained in one pass, therefore saving considerable time in the execution of the work, without increasing the nuisance due to dust.

While the spreader according to the invention is described in relation to a self-propelled platform, the invention extends to other types of vehicles which are generally used for spreading, for example self-propelled towing vehicles and towing vehicles with trailer.

I claim:

1. A spreader for treating soil with a treatment product comprising a silo having a lower part forming a hopper, said hopper being in the form of a truncated prism having an upper base and a lower truncated part, a metering device attached to said lower part, said lower part and said metering device extending substantially over the entire width of the spreader to treat the soil over substantially the entire width of the spreader without trituring the product to be spread, a frame open over substantially the entire width of the spreader for receiving the silo, and supporting devices for effecting translatory movement of the silo and the metering device including raising and lowering the silo and the metering device vertically relative to the soil to adjust the elevation of the metering device above the soil to be treated.

2. A spreader according to claim 1 wherein said supporting devices are mounted on said spreader for tilting the silo and the metering device forwards and backwards relative to a transverse axis.

3. A spreader according to claim 1 wherein said supporting devices comprise extensible and retractable jacks disposed adjacent the periphery of the silo and having articulated connections with said silo.

4. A spreader according to claim 1 wherein said metering device comprises a large diameter rotor having small cells.

5. A spreader according to claim 1 including means for releasably attaching said metering device to the hopper, enabling replacement thereof by a different type of metering device.

6. A spreader according to claim 1 wherein said frame has a transverse cross-section constant with respect to the longitudinal axis of the spreader and said silo has a width substantially corresponding with respect to the width of the opening of the frame.

7. A spreader according to claim 6 including four wheels pivotable through 180° and disposed at the four corners of said frame to widen the track, increase stability of the spreader and avoid crushing edges of the strips of material discharged onto the soil.

8. A spreader according to claim 1 including a generally vertical, transversely extending, central partition dividing the silo into two parts, and a closure for controlled closing of the junction between said parts and the metering device to enable feed from one or another of said two parts of the silo.

9. A spreader according to claim 8 including two rotatable metering devices of different diameters for feeding product from each of the two parts of the silo respectively, said vertical central partition being movable to delimit two unequal parts whose volumes correspond to the flow rates of the metering devices.

10. A spreader according to claim 1 including a filter supported by a trailer and coupled to the spreader in a transportation position, said silo having an opening for connection with said filter enabling air within the silo to be evacuated.

11. A spreader according to claim 1 including a mixing means disposed behind said metering device to mix the soil and product spread on the soil, and means for attaching said mixing means to the frame enabling adjustment of the height of said mixing means with respect to the soil.

12. A spreader according to claim 11 including two casings enclosing the mixing means and the metering device, respectively, and containing openings fitted together one within the other in the operating position to seal the assembly thereof.

13. A spreader according to claim 11 wherein said mixing means are divided into two separate parts with respect to a longitudinal plane of symmetry through the spreader and disposed in front of each of the rear wheels, respectively, forming a non-mixing space therebetween to mix two strips of soil for crushing by said rear wheels.

14. A spreader according to claim 11 including soil shearing means disposed in front of said metering device to loosen the soil prior to spreading the product, and means for attaching said shearing means to said frame and for adjusting the height thereof with respect to the soil, said attaching means being operable independently of said extensible and retractable devices.

15. A spreader according to claim 14 wherein said shearing means are fitted with an independent motor enabling the tensile stress of the spreader on the shearing means to be minimized.

16. A spreader according to claim 1 including means for measuring the weight of the silo and the metering device, means for processing signals obtained by said measuring means to determine from the variation in the measured weight the flow of the product spread on the soil and to control the flow rate of the metering device to obtain a uniform distribution of the product on the soil.

17. A spreader according to claim 16 wherein said supporting devices include extensible and retractable devices, said measuring means operating on oil pressure in said extensible and retractable devices.

18. A spreader according to claim 1 including means enabling the position of the strip of product spread on the soil to be detected and the direction of advance of the spreader to be controlled to maintain the successive strips of spread product contiguous with each other.

* * * * *